Nov. 19, 1963 L. P. FRIEDER ETAL 3,111,143
COUPLING COVER
Filed Feb. 18, 1960
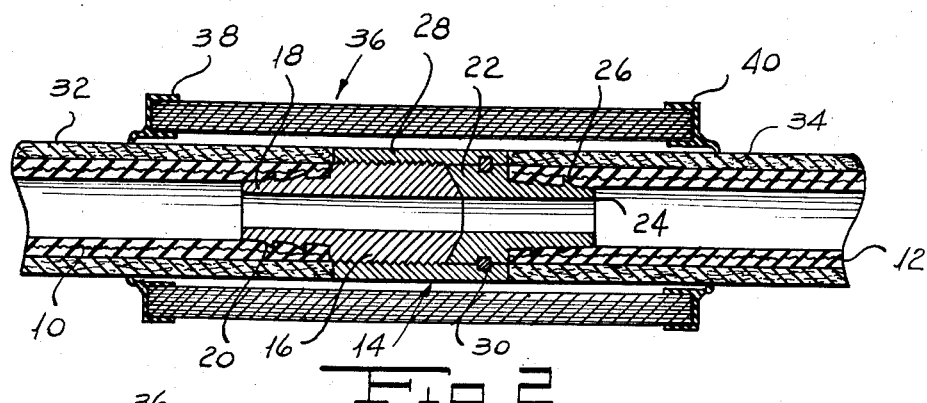
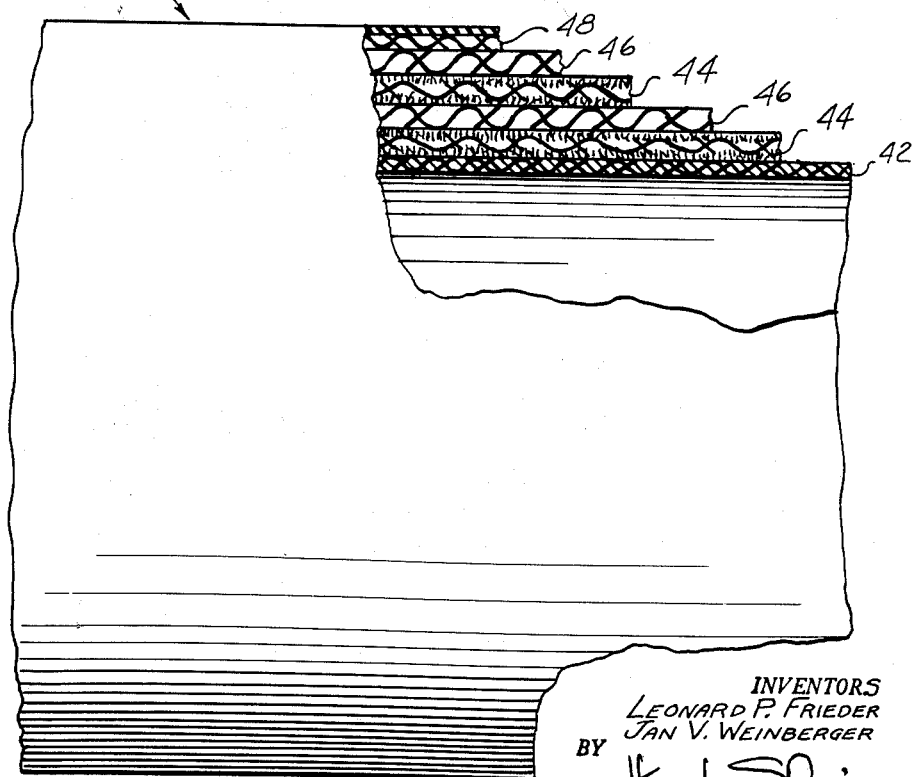
INVENTORS
LEONARD P. FRIEDER
JAN V. WEINBERGER
BY
ATTORNEY

United States Patent Office 3,111,143
Patented Nov. 19, 1963

3,111,143
COUPLING COVER
Leonard P. Frieder, Great Neck, N.Y., and Jan V. Weinberger, Ottawa, Ontario, Canada, assignors to Gentex Corporation, New York, N.Y., a corporation of Delaware
Filed Jan. 18, 1960, Ser. No. 2,909
9 Claims. (Cl. 138—124)

Our invention relates to a coupling cover and, more particularly, to a cover for protecting high pressure hose or tube couplings against failure which might otherwise result from the exposure of the tubing in the region of the coupling to heat.

In aircraft engines and in missile installations, in control lines of hydraulic systems for carrying fluid to hydraulic servo motors and in other instances, high pressure tubing or hoses are employed to convey highly combustible fluids. Hoses of the prior art employed in such applications usually are formed from rubber or plastic reinforced with tightly braided wire or fabric members. At various points along the length of a line adapted to convey fluid it is necessary to join lengths of tubing or to attach the tubing to another element by means of a coupling, particularly the connecting members by which the hose is attached to the fire wall. It is desirable that such tubing be protected from or be able to withstand exposure to high heat for a relatively long period of time. Upon exposure of tubing of the prior art to heat the plastic or rubber material deteriorates relatively rapidly at the interface area where the metallic portions of the end fitting make contact with the organic matter of which the tube or hose is composed due to the rapid conduction of the heat from the exposed metallic portion of the end fitting. In testing hose of this type a failure of the hose is defined as leakage of fluid to the surrounding area as distinguished from mere seepage which is not considered a failure. We have discovered that failures are very much more likely to occur in the region of the tube coupling than directly through the wall of the tube. That is, leakage through the tube wall upon the application of heat is less likely since the decomposed residue of the plastic or rubber material clogs in the dense reinforcing braid or braids thus preventing leakage. This action, however, does not prevail at the points at which lengths of tubing are secured to the parts of a coupling. At these points decomposition of the plastic or rubber material permits the fluid being conveyed to escape around the end of the tube through the area between the tube and the coupling element to which it is secured.

We have invented a coupling cover which protects a hose in the area of the coupling against failure from leakage of fluid around the ends of the hose lengths secured to the coupling. Our coupling cover protects the tube coupling against the harmful effects of exposure to high heat for a relatively long period of time.

One object of our invention is to provide a coupling cover for protecting hose or tubing coupling members or fittings against failure upon exposure to high heat by leakage of the fluid being conveyed around the edges of the tube lengths attached to the coupling.

A further object of our invention is to provide a coupling cover which withstands extremely high temperatures over a period of time without substantial deterioration.

A still further object of our invention is to provide a coupling cover adapted for use in installations at which highly combustible liquids are being conveyed.

Other and further objects of our invention will appear from the following description.

In general our invention contemplates the provision of a coupling cover including an inner liner which is impervious to the passage of air and a plurality of intermediate layers each having a laminate of heat resistant fabric and a layer of bulky insulating cloth which inhibits the ready transfer of heat between adjacent heat resistant fabric laminates. We build up the above assembly by applying the impervious inner liner to a mandrel and then wrapping superposed sheets of heat resistant fabric and bulky insulating cloth around the mandrel. When this has been done we braid an outer cover of asbestos yarns over the assembly and rubberize the completed assembly.

In the accompanying drawings which form part of the instant specification and which are to be read in conjunction therewith and in which like reference numerals are used to indicate like parts in the various views:

FIGURE 1 is a sectional view of a high pressure tubing coupling to which our coupling cover is applied.

FIGURE 2 is a fragmentary view with parts in section of a length of our coupling cover showing the construction and arrangement of the various layers of the coupling cover.

Referring now more particularly to FIGURE 1 of the drawings, a pair of lengths 10 and 12 of high pressure tubing are joined by means of a coupling indicated generally by the reference character 14. The lengths 10 and 12 may, for example, be high pressure tubing formed of rubber or plastic and provided with braided reinforcing sleeves of wire or fiber. The coupling 14 includes a threaded male member 16 provided with an extension 18 which is inserted in length 10 of tubing for example. The member 16 includes any suitable means such for example as barbs 20 which retain the member in the length 10. Coupling 14 includes a female member 22 having an extension 24 adapted to be inserted in the end of the length 12 of tubing. A threaded sleeve 28 rotatably supported on the member 22 by any suitable means such as by a ring 30 or the like is adapted to be screwed onto the member 16 to draw the male and female members 16 and 22 together to provide an extremely tight coupling between the two lengths 10 and 12 of tubing. If desired we may apply protective sleeves 32 and 34 to the lengths 10 and 12 of tubing. Preferably the sleeves 32 and 34 are of the nature disclosed in the copending application of Leonard P. Frieder and Jan V. Weinberger, Serial No. 825,063, filed July 6, 1959, for a High Temperature Resistant Tubing.

As has been explained hereinabove, we have discovered that upon the application of heat to lengths of tubing connected by a coupling such as a coupling 14 failure by leakage is very much more likely to occur around the ends of the lengths 10 and 12, secured to the members 16 and 22, than through the walls of the tubing. We have devised a coupling cover indicated generally by the reference character 36 for protecting the coupling against failures of this nature. We employ any suitable means such as respective fittings 38 and 40 formed of rubber or plastic for assembling the cover 36 over the coupling 14.

Referring now to FIGURE 2 the cover 36 includes an inner liner 42 which is a relatively closely woven fiber glass fabric impregnated with a vinyl resin such, for example, as "Hycar" which is the registered trademark of B. F. Goodrich Co. for synthetic rubbers which are copolymers of butadiene and acrylonitrile or copolymers of butadiene and styrene. This inner liner is formed by assembling a length of the impregnated fabric around a mandrel. It forms a hard, smooth surface of the liner, the wall of which is impermeable to the passage of air.

After having applied the inner liner 42 to the mandrel we build up a plurality of intermediate laminates each of which has a bulky insulating fabric layer 44 and a layer 46 of heat resistant fabric.

We form each of the layers 44 of low twist yarns made up of a blend of Angora, fine wool, nylon, and acetate. Both the Angora wool and fine sheep's wool fibers are naturally crimped with the result that they form air spaces or pockets to provide insulation in the sleeve 18. When these natural fibers are twisted into a soft yarn they are not readily handled in subsequent processing and weaving on a loom. If the fibers are twisted tightly enough to permit them to be easily handled on a loom their insulating property is lessened. To avoid this latter result and to form a yarn which at once has good insulating properties and which at the same time may readily be woven on a loom we blend with the wool fibers carrier fibers of high tensile strength which may, for example, be fibers of nylon, which is a synthetic, alcohol-soluble, orientable, long chain, polymeric amide which has recurring amide groups as an integral part of the main polymer chain. We may form the carrier either from nylon fibers alone or preferably we incorporate a percentage of acetate fibers to prevent appreciable shrinkage in the sleeve.

We make the yarns of the layer 44 of our coupling cover from a mixture of from about 45% to about 65% by weight of fine sheep's wool fibers with an optimum of about 50% by weight of sheep's wool and Angora wool in an amount of from 15% to 35% by weight with an optimum amount of approximately 25% by weight. These yarns of the layer 44 include cellulose acetate rayon fiber in an amount from 5% to about 20% by weight with an optimum of 15% by weight together with nylon fibers in an amount of from 5% to 15% by weight of the yarn with an optimum of 10% by weight of the yarn. When the blend of fibers outlined above have been spun into a soft, bulky, low-twist yarn, we weave the fabric of layer 44 from the yarn. After having woven the fabric we brush both faces of the fabric to raise a pile to give the fabric as much bulk as is possible.

We form each of the layers 46 of our coupling cover from a fabric having a high resistance to heat. This fabric includes a plurality of large-gauge wefts or fillers bound together by intersecting woven binding fabrics trained around the fillers so that in the finished cloth each filler is substantially completely enveloped. The fillers of the fabric layers 46 are formed from a fine-staple fiber of a polymer of acrylonitrile adapted under exposure to extreme heat first to shrink and eventually to disintegrate in large part directly from the solid into the gaseous state.

The outer fabric layer of the layer 44 is made up from yarns of glass fibers usually twisted with high-tenacity, continuous-filament yarns to improve the physical properties as necessary for the subsequent operations. Portions of the inner layer binding fabric of the heat resistant cloth making up the layer 44 may be made from brushable yarns which are the weft yarns of the inner binder fabric and which are formed from a blend of Angora and fine wool for example. The structure of the heat resistant cloth making up the layers 46 is more fully shown and described in Patent No. 2,884,018 issued to Henri Delcellier and Jan V. Weinberger on April 28, 1959.

We assemble the layers 44 and 46 making up the intermediate laminates on the arbor carrying the inner liner 42 by stacking a plurality of sheets of the heat resistant cloth 46 and the fabric making up layers 44 to form the required number of intermediate laminates. As can be seen by reference to the drawings the lowest sheet of the stack is a sheet of the fabric 44 and the upper sheet is a sheet of the heat resistant cloth making up the layer 46 with adjacent sheets of heat resistant cloth making up layers 46 being separated by sheets of cloth making up layers 44. After the stack of sheets has been built up we wrap the assembly around the mandrel over the inner liner 42 thus to form the intermediate laminates each of which includes a layer 44 and a layer 46.

Following the building up of the intermediate laminates in the manner described we braid an outer cover 48 over the assembly. Cover 48 is formed from asbestos yarns spun over a fiber glass core to give the yarns greater tensile strength to permit them to be handled by a braiding machine without breaking. After braiding the asbestos outer cover 48 over the assembly of sheets we apply a coating of neoprene or rubber mixed with antimony oxide. Preferably we incorporate aluminum flakes in the rubber or neoprene coating to enhance the infra-red reflecting properties of the cover.

In use of our coupling cover in order to apply the cover to a coupling one end of the coupling may be temporarily closed and compressed air blown into the coupling from the other end. The impervious inner liner 42 inhibits the passage of the air through the wall of the tube with the result that the cover expands to permit it to be readily slipped over the coupling. The outer rubber covering having the mixture of antimony oxide protects the coupling cover against damage from abrasion and other mechanical injury and in addition contributes to the flame resistant property of the cover. The asbestos sleeve 48 functions not only to hold the sheets forming the intermediate layer assembled but also it is able to receive the rubber coating which cannot effectively be applied to the surface of the heat resistant cloth making up layer 46. The cloth 46 resists the penetration of heat through its wall in a manner which is more fully described in the Delcellier et al. patent referred to hereinabove. The layers 44 of bulky insulating fabric inhibit the ready transfer of heat between the thermal cloth layers 46 to enhance the action of our coupling cover in protecting couplings against failure upon the application of heat. The inner layer 44 of insulating cloth inhibits the ready transfer of heat to the inner liner 42.

It will be seen that we have accomplished the objects of our invention. We have provided a coupling cover for protecting high pressure tubing couplings against failure by leakage upon the application of heat. Our coupling cover resists the ready transfer of heat through its wall. The construction of our coupling cover is such that it may readily be assembled on a coupling.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A coupling cover including in combination a first tube of woven heat-resistant cloth having the property of absorbing a large quantity of heat upon exposure thereto, a second tube of woven heat-resistant cloth having the property of absorbing a large quantity of heat upon exposure thereto, a tube of soft bulky woven insulating material having the property of inhibiting the ready transfer of heat therethrough disposed between said tubes of woven heat-resistant cloth and means for holding said tubes in assembled relationship.

2. A coupling cover including in combination an impervious inner liner, a first tube of woven heat-resistant cloth having the property of absorbing a large quantity of heat upon exposure thereto, a second tube of woven heat-resistant cloth having the property of absorbing a large quantity of heat upon exposure thereto, a tube of soft bulky woven insulating material having the property of inhibiting the ready transfer of heat therethrough sandwiched between said tubes of heat resistant cloth and means for holding said tubes assembled in tubular relationship on said inner liner.

3. A coupling cover including in combination a first tube of soft bulky woven insulating material having the property of inhibiting the ready transfer of heat therethrough, a first tube of woven heat-resistant cloth having the property of absorbing a large quantity of heat upon exposure thereto carried by said first tube of bulky insulating material, a second tube of soft bulky woven insulating material having the property of inhibiting the ready transfer of heat therethrough carried by said first tube of heat-resistant cloth, a second tube of woven heat-resistant cloth having the property of absorbing a large quantity of heat upon exposure thereto carried by said second tube of bulky insulating material and means for holding said tubes assembled in tubular relationship.

4. A coupling cover including in combination an impervious inner liner, a first tube of soft bulky woven insulating material having the property of inhibiting the ready transfer of heat therethrough carried by said inner liner, a first tube of woven heat-resistant cloth having the property of absorbing a large quantity of heat upon exposure thereto carried by said first tube of bulky insulating material, a second tube of soft bulky woven insulating material having the property of inhibiting the ready transfer of heat therethrough carried by said first tube of woven heat-resistant cloth, a second tube of woven heat-resistant cloth having the property of absorbing a large quantity of heat upon exposure thereto carried by said second tube of bulky woven insulating material and means for holding said tubes in assembled relationship on said inner liner.

5. A coupling cover including in combination a first tube of woven heat-resistant cloth having the property of absorbing a large quantity of heat upon exposure thereto, a second tube of woven heat-resistant cloth having the property of absorbing a large quantity of heat upon exposure thereto, a tube of soft bulky woven insulating material having the property of inhibiting the ready transfer of heat therethrough sandwiched between said tubes of said heat resistant fabric and a braided sleeve for holding said tubes assembled in tubular relationship.

6. A coupling cover including in combination an impervious inner liner, a plurality of laminated tubes, each of said tubes including a laminate of soft bulky woven insulating material having the property of inhibiting the ready transfer of heat therethrough and a laminate of a woven heat-resistant fabric having the property of absorbing a large quantity of heat upon exposure thereto and a braided sleeve for holding said laminates assembled in tubular relationship.

7. A coupling cover including in combination an impervious inner liner, a pair of tubes of heat-resistant woven fabric having the property of absorbing a large quantity of heat upon exposure thereto carried by said inner liner, a tube of soft bulky woven insulating material having the property of inhibiting the ready transfer of heat therethrough sandwiched between said heat-resistant tubes and a braided sleeve for holding said tubes assembled on said inner liner.

8. A coupling cover including in combination a pair of tubes of woven heat-resistant fabric having the property of absorbing a large quantity of heat upon exposure thereto, said fabric comprising filler yarns including a major portion of a polymer of acrylonitrile, a tube of soft bulky woven insulating material having the property of inhibiting the ready transfer of heat therethrough, said material comprising brushable low twist yarns including a major portion of naturally crimped animal fibers disposed between said tubes of woven heat-resistant fabric and means for holding said tubes assembled in tubular relationship.

9. A coupling cover including in combination a first tube of soft bulky woven insulating material having the property of inhibiting the ready transfer of heat therethrough, a first tube of woven heat resistant fabric having the property of absorbing a large quantity of heat upon exposure thereto carried by said first tube of bulky insulating material, a second tube of soft bulky insulating material having the property of inhibiting the ready transfer of heat therethrough carried by said first tube of heat-resistant fabric, a second tube of heat resistant fabric having the property of absorbing a large quantity of heat upon exposure thereto carried by said second tube of soft bulky woven insulating material, said insulating material comprising low twist yarns including a major portion of naturally crimped animal fibers, said heat resistant fabric comprising filler yarns including a major portion of a polymer of acrylonitrile and means for holding said tubes in assembled relationship.

References Cited in the file of this patent

UNITED STATES PATENTS

| | | |
|---|---|---|
| 584,428 | Tucker | June 15, 1897 |
| 932,080 | Woods | Aug. 24, 1909 |
| 1,901,330 | Poberejsky | Mar. 14, 1933 |
| 2,019,417 | King | Oct. 29, 1935 |
| 2,312,282 | Peet | Feb. 23, 1943 |
| 2,405,330 | Ryder | Aug. 6, 1946 |
| 2,741,108 | Rogosin | Apr. 10, 1956 |
| 2,884,018 | Delcellier | Apr. 28, 1959 |
| 2,930,406 | Galloway | Mar. 29, 1960 |

FOREIGN PATENTS

| | | |
|---|---|---|
| 517,814 | Canada | Oct. 25, 1955 |